(12) United States Patent
Wang

(10) Patent No.: US 6,639,635 B2
(45) Date of Patent: Oct. 28, 2003

(54) LIQUID CRYSTAL DISPLAY DEVICE

(75) Inventor: Ming Tien Wang, Shin-Shih (TW)

(73) Assignee: Chi Mei Optoelectronics Corp., Tainan (TW)

( * ) Notice: Subject to any disclaimer, the term of this patent is extended or adjusted under 35 U.S.C. 154(b) by 33 days.

(21) Appl. No.: 10/083,559

(22) Filed: Feb. 27, 2002

(65) Prior Publication Data

US 2003/0160909 A1 Aug. 28, 2003

(51) Int. Cl.⁷ .............................................. G02F 1/1333
(52) U.S. Cl. ...................................................... 349/58
(58) Field of Search ..................................... 349/58, 60

Primary Examiner—Robert H. Kim
Assistant Examiner—George Y. Wang
(74) Attorney, Agent, or Firm—Lowe Hauptman Gilman & Berner LLP

(57) ABSTRACT

A liquid crystal display (LCD) device includes a liquid crystal panel, a back light unit, a housing and a frame. The liquid crystal panel has opposing upper and lower surfaces. The back light unit is disposed under the lower surface of the liquid crystal panel and joined with it. The housing supports the back light unit and has a wall adjacent to the back light unit. The frame has a first portion covering at least one edge of the upper surface of the liquid crystal panel and a second portion coupled to the wall of the housing. The LCD device is characterized by having at least one projection formed at the wall of the housing for pressing the second portion of the frame away from the wall such that the first portion of the frame is curved and concave toward the liquid crystal panel.

15 Claims, 5 Drawing Sheets

LIQUID CRYSTAL DISPLAY DEVICE

BACKGROUND OF THE INVENTION

1. Field of the Invention

This invention relates to a liquid crystal display device, and more particularly to a liquid crystal display device with high mechanical strength.

2. Description of the Related Art

In general, a liquid crystal display (LCD) device used for a computer such as a portable computer or for a portable display is shown in FIG. 1. Referring to FIG. 1, the LCD device 10 includes a liquid crystal panel 100, a back light unit 101, and a driving circuit board 102. The back light unit 101 is composed of a luminescent lamp 104, a lamp housing 106, a light guide 108, a reflector 110 reflecting the incident light from the horizontal direction to the vertical direction, a protection sheet 112 contacting the light guide 108, a first prism sheet 114 and a second prism sheet 116 set on the protecting sheet 112, a diffuser 118 diffusing the light from the first and second prisms 114 and 116 to a viewing area 120 of the liquid crystal panel 100 with a certain viewing angle, and a housing 122 supporting these elements. The liquid crystal display device 10 also comprises a frame 124 coupled to the housing 122 for holding the liquid crystal panel 100 and back light unit 101.

Referring to FIG. 2, the liquid crystal display device 10 is usually combined with, for example, a notebook computer (not shown) as an output screen via a rear case 130 and a front case 134. The housing 122 of the LCD device 10 is mounted to the rear case 130 and the front case 134 using fastening elements, like screws 132. The front case 134 has a blank area adjusted to the viewing area.

FIG. 3a is a cross-sectional view taken from the line 3a—3a of FIG. 2. As shown, the frame 124 of the LCD device 10 has a plurality of holes 138 defined therein, and the housing 122 has a plurality of projections 136 for snap fitting into the holes 138 of the frame 124. The projections 136 of the housing 122 are engaged with the holes 138 of the frame 124 such that the housing 122 and the frame 124 are combined with each other.

Typically, as shown in FIG. 2, there is no hole formed in the central part 140 of the longer sides 142 of the frame 124 thereby acquiring a higher mechanical strength. Therefore, as shown in FIG. 3b, the central part of the housing 122 (corresponding to the central part 140 of the frame 124) is flat without any projection provided thereon. However, when the liquid crystal display device 10 is subjected to environment tests, especially the vibration test, stress is generally maximum at the central part 140 of the longer sides 142 of the frame 124 thereby causing unacceptable deformation at the central part 140

Accordingly, there exists a need in the art for a liquid crystal display device which overcomes, or at least reduces the above-mentioned problems of the prior art.

SUMMARY OF THE INVENTION

Therefore, it is an object of the present invention to provide a liquid crystal display device with high mechanical strength, particularly in the central portion of the longer side thereof.

To achieve the above listed and other objects, the present invention provides a liquid crystal display device mainly comprising a liquid crystal panel, a back light unit, a housing and a frame. The liquid crystal panel has opposing upper and lower surfaces. The back light unit is disposed under the lower surface of the liquid crystal panel and joined with it. The housing supports the back light unit and has a wall erected around the back light unit. The frame has a first portion covering at least one edge of the upper surface of the liquid crystal panel and a second portion coupled to the wall of the housing.

According to a first preferred embodiment of the present invention, the housing has at least one projection formed at the wall and the second portion of the frame is pressed by the projection such that the first portion of the frame is curved and concave toward the upper surface of the liquid crystal panel. Preferably, the second portion of the frame is curved and concave to touch the upper surface of the liquid crystal panel. Preferably, the projection is integrally formed with the housing.

According to a second preferred embodiment of the present invention, the second portion of the frame has at least one projection protruded in a direction toward the wall of the housing and the projection of the frame is pressed by the wall of the housing such that the first portion of the frame is curved and concave toward the upper surface of the liquid crystal panel and preferably touches the liquid crystal panel. It is preferred that the projection is integrally formed with the frame. Alternatively, the projection may be formed by press operation applied to the second portion of the frame.

Preferably, the projection is formed in the central part of the longer portion of the wall or the longer side of the second portion of the frame such that the first portion of the frame is curved in the central part of the longer side thereof. This significantly reinforces and stabilizes the structure of the frame and improves the mechanical strength of the frame, particularly in the central portion of the longer side thereof It is preferred that the projection is chamfered to facilitate assembly of the frame and the housing.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

Figure 1:
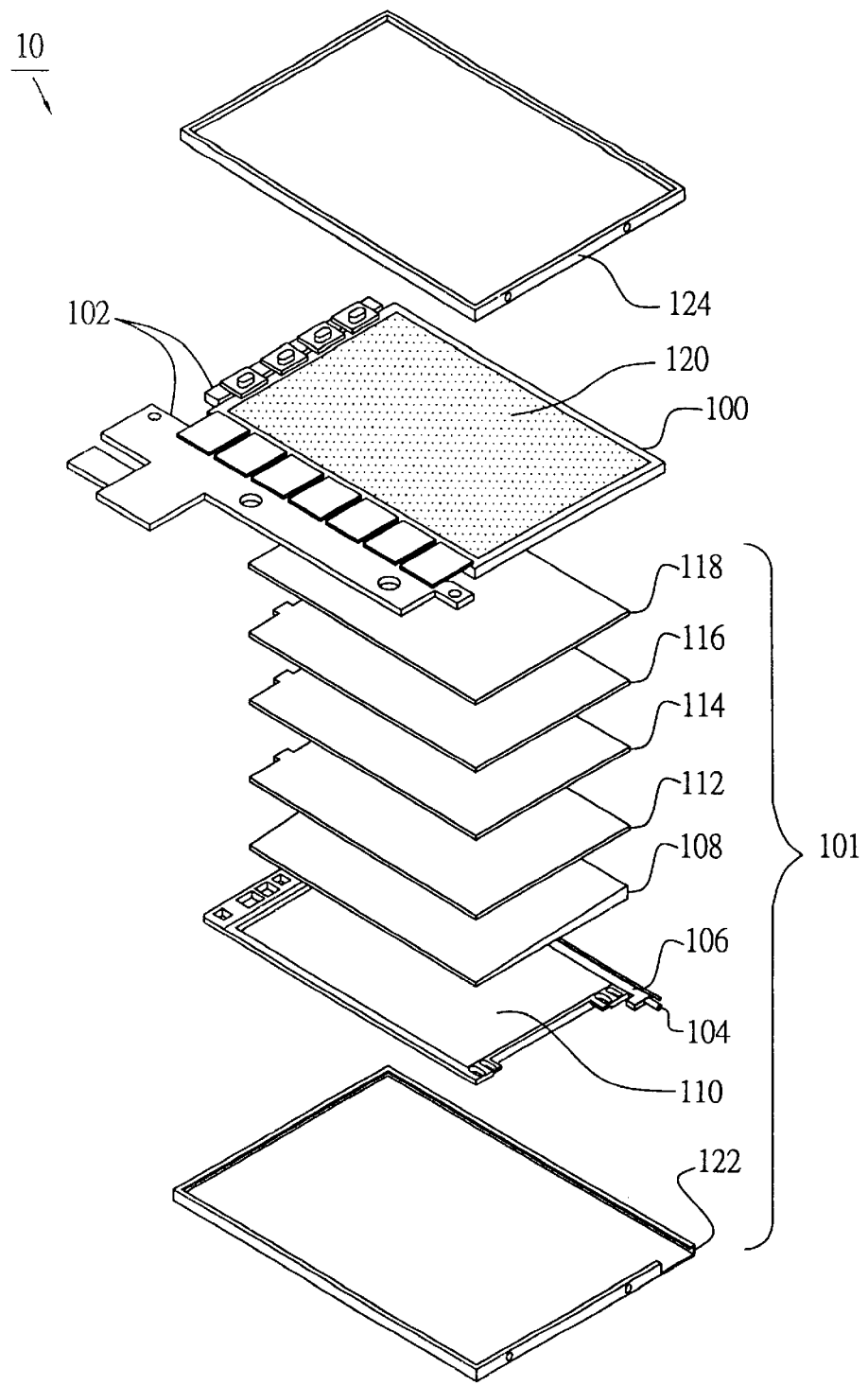
FIG. 1 is a perspective view showing the structure of a conventional liquid crystal display device.
Figure 2:
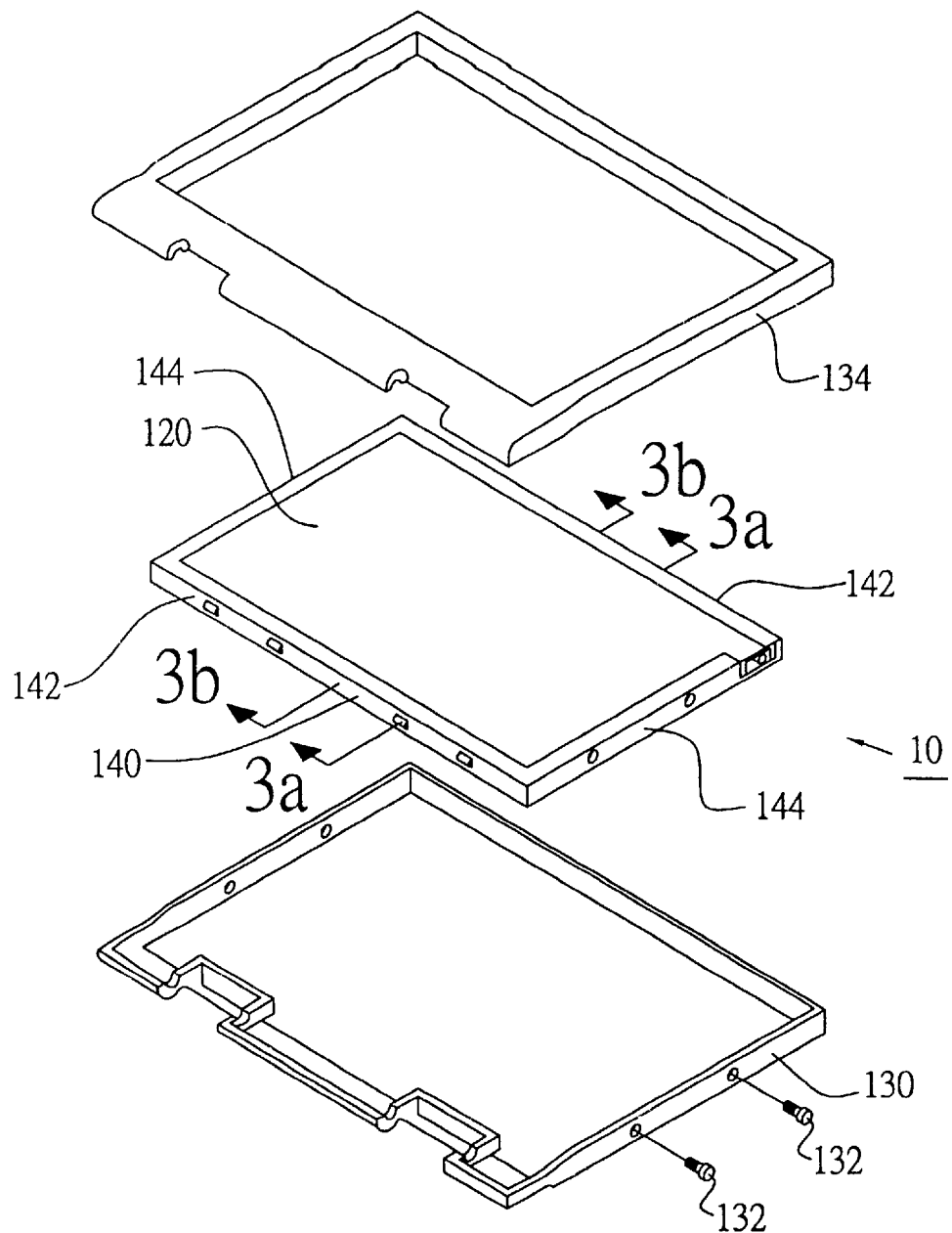
FIG. 2 is a perspective view of a front case, a rear case and the assembly structure of the liquid crystal display device shown in FIG. 1.
Figure 3A:
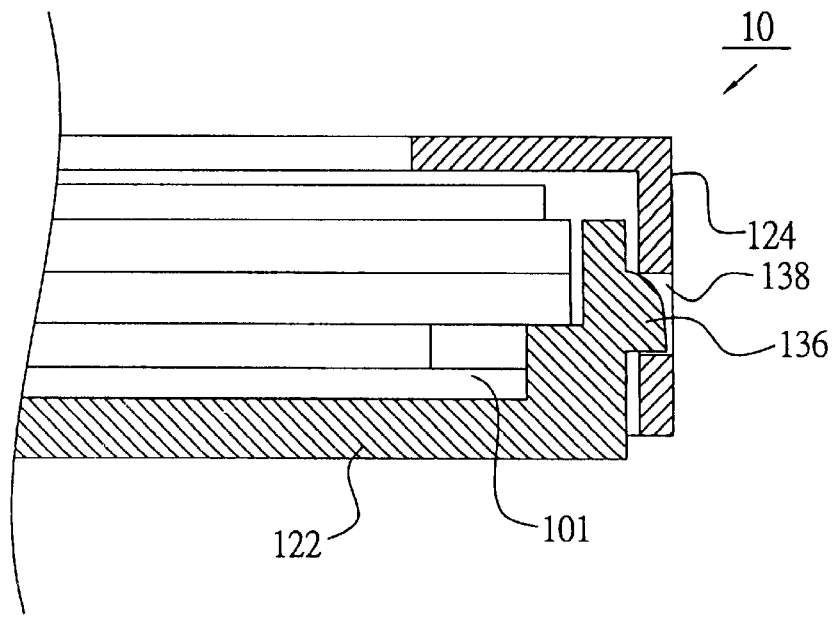
FIG. 3a is a cross-sectional view taken from the line 3a—3a of FIG. 2.
Figure 3B:
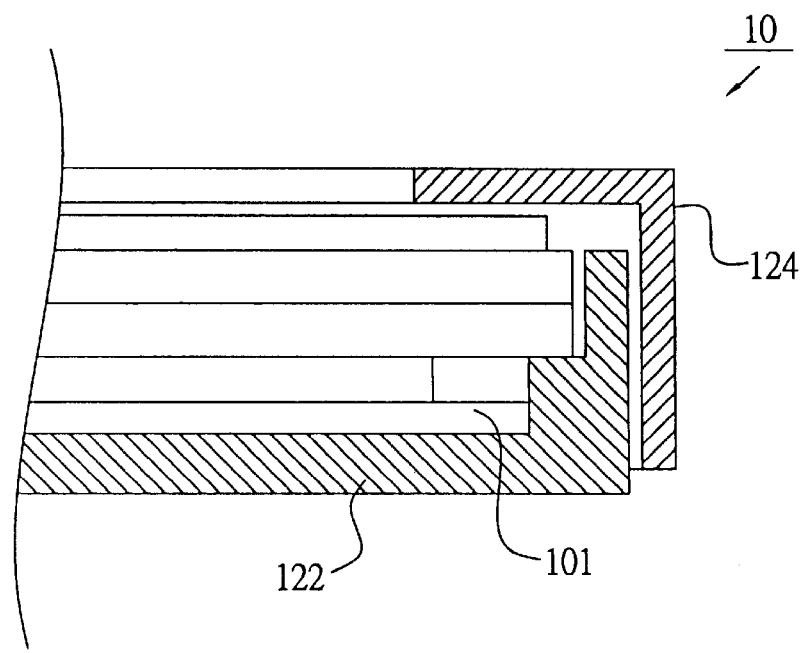
FIG. 3b is a cross-sectional view taken from the line 3b—3b of FIG. 2.

While the present invention is susceptible of embodiment in various forms, there are presently preferred embodiments shown in the drawings and will hereinafter be described with the understanding that the present disclosure is to be considered as an exemplification of the invention and is not intended to limit the invention to the specific embodiment illustrated.

Figure 4:
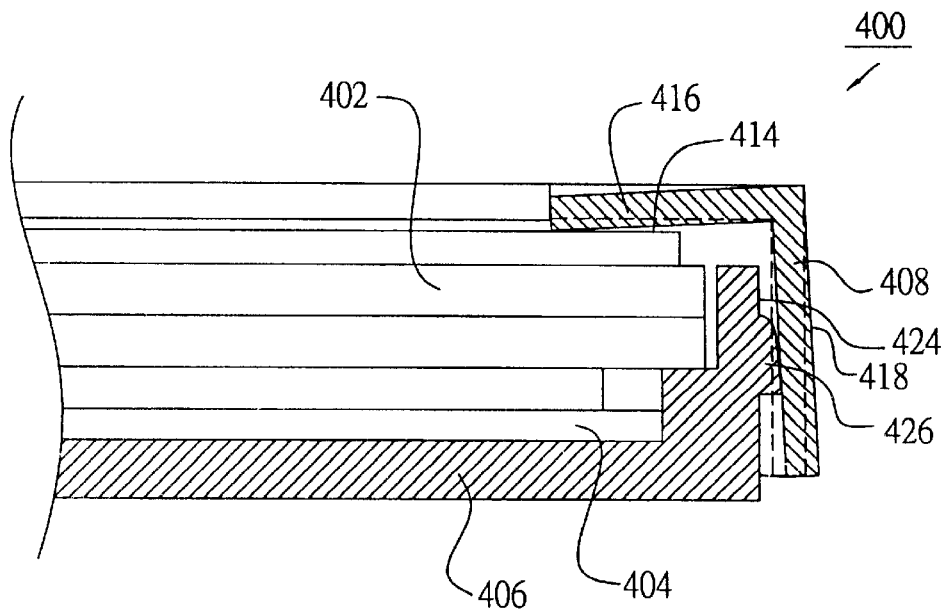
FIG. 4 is a cross-sectional view of a liquid crystal display device according to a first preferred embodiment of the present invention.

FIG. 4 shows a liquid crystal display device 400 according to a first preferred embodiment of the present invention comprising a liquid crystal panel 402, a back light unit 404, a housing 406 and a frame 408.

The liquid crystal panel 402 has opposing upper and lower surfaces (only the upper surface is denoted by the reference numeral 414). The back light unit 404 is disposed under the lower surface of the liquid crystal panel 402 and joined with it. The housing 406, preferably made of plastic, supports the back light unit 404 and has a wall 424 adjacent to the back light unit 404. Although not shown in FIGS. 4–6, the frame 408 preferably made of metal is coupled to the housing 406 using fastening elements such as screws or snap fitting projections/holes. The liquid crystal device has two longer sides land two shorter sides. Accordingly, the frame and the housing have two longer sides (portions) and two shorter sides (portions), respectively. The frame 408 has a first portion 416 covering on at least one edge of the upper surface 414 of the liquid crystal panel 402, and a second portion 418 coupled to the housing 406. The first portion 416 of the frame 408 is substantially perpendicular to the second portion 418. The wall 424 of the housing 406 is substantially parallel to the second portion 418 of the frame 408 for coupling to the frame 408.

The liquid crystal display device 400 is characterized by having at least one projection 426 formed at the wall 424of the housing 406 for pressing the second portion 418 of the frame 408 away from the wall 424. The projection 426 may be integrally formed with the housing 406. It is preferred that the projection 426 is formed in the central part of the longer portion of the wall 424 of the housing 406. After assembling the frame 408 to the housing 406, the second portion 418 of the frame 408 is pressed by the projection 426 such that the first portion 416 of the frame 408 is curved and concave toward the upper surface 414 of the liquid crystal panel 402. Preferably, one part of the first portion 416 of the frame 408 is curved and concave to touch the liquid crystal panel.

Figure 5:
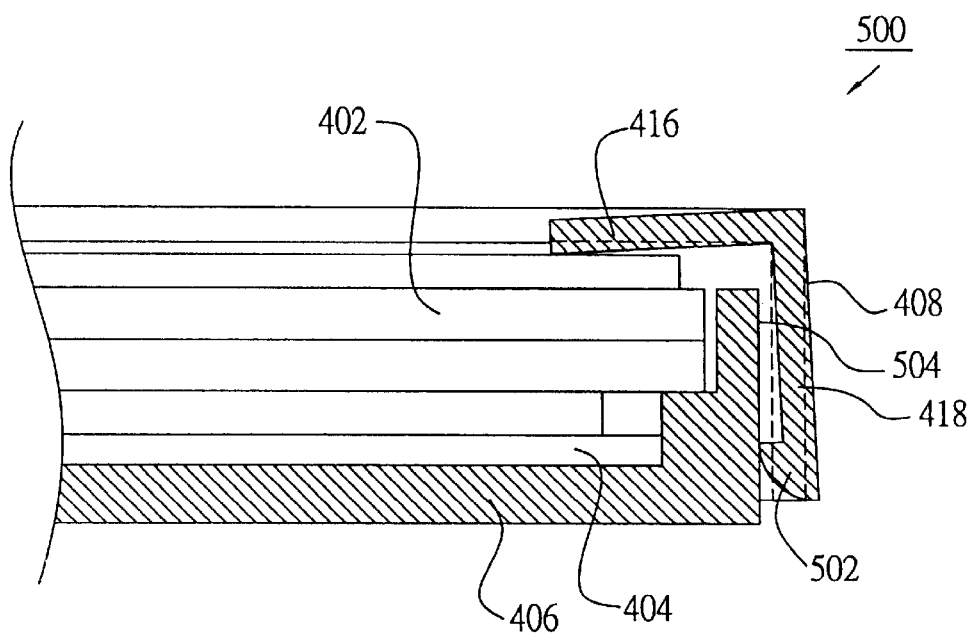
FIG. 5 is a cross-sectional view of a liquid crystal display device according to a second preferred embodiment of the present invention.

FIG. 5 shows a liquid crystal display device 500 according to a second preferred embodiment of the present invention. The liquid crystal display device 500 is characterized by having at least one projection 502 formed at the second portion 418 of the frame 408 dislocating the second portion 418 of the frame 408 away from the housing 406 The projection 502 may be integrally formed with the frame 408. The frame 408 has a wall 504 adjacent to the back light unit 404. The wall 504 is substantially parallel to the second portion 418 of the frame 408 for coupling to the frame 408. The projection 502 is protruded in a direction toward the wall 504 of the housing 406. The part of the wall 504 corresponding to the projection 502 is substantially flat. After assembling the frame 408 to the housing 406, the projection. 502 of the second portion 418 of the frame is pressed by the wall 504 of the housing 406 such that the first portion 416 is curved and concave toward the upper surface 414 of the liquid crystal panel 402. Preferably, one part of the first portion of the frame is curved to touch the liquid crystal panel 402.

Figure 6:
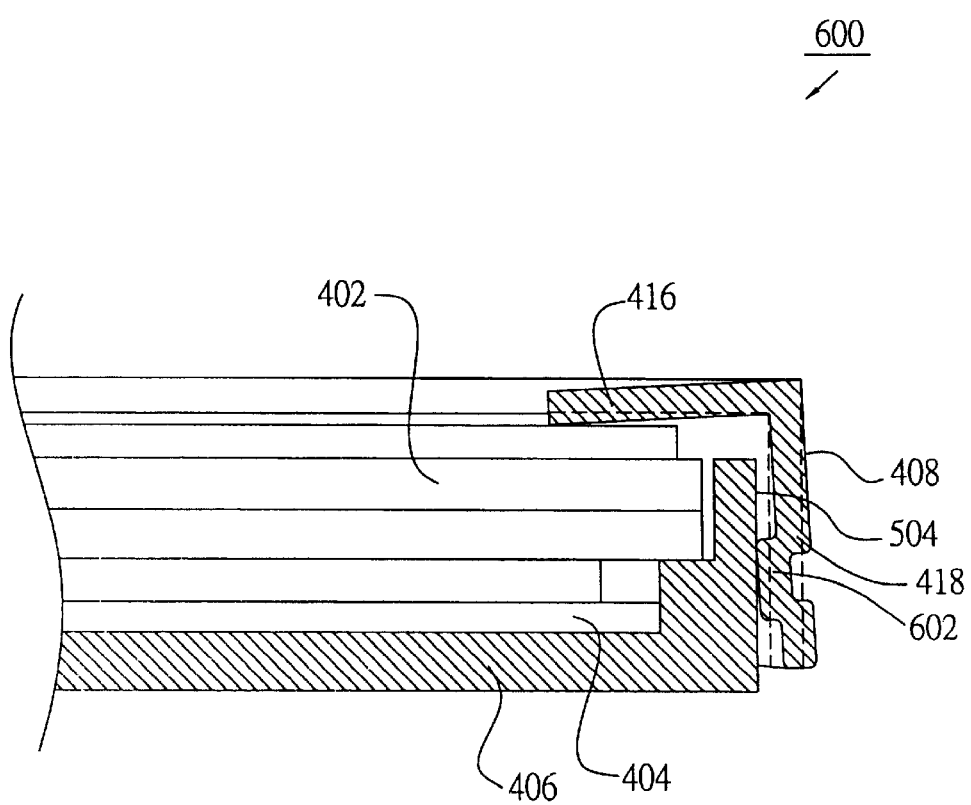
FIG. 6 is a cross-sectional view of a liquid crystal display device according to a third preferred embodiment of the present invention.

FIG. 6 shows a liquid crystal display device 600 according to a third preferred embodiment of the present invention. The liquid crystal display device 600 is substantially identical to the LCD 500 of FIG. 5 with the exception that the projection 502 is replaced by a projection 602 which is a protruded segment of the second portion 418: of the frame 408 and is formed by press operation.

It is preferred that the projections 426, 502, 602 are chamfered to facilitate assembly of the frame and the housing.

Preferably, the projection is formed in the central part of the longer portion of the wall 424 or the longer side of the second portion 418 of the frame such that the first portion of the frame is curved in the central part of the longer side thereof. This significantly reinforces and stabilizes the structure of the frame and improves the mechanical strength of the frame, particularly in the central portion of the longer side thereof.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure arrangement, proportions, materials, elements, and components and otherwise, used in the practice of the invention, which are particularly adapted to specific environments and operating requirements without departing from the principles of the present invention. The presently disclosed embodiments are therefore to be considered in all respects as illustrative and not restrictive, the scope of the invention being indicated by the appended claims and their legal equivalents, and not limited to be the foregoing description.

What is claimed is:

1. A liquid crystal display device comprising:
    a liquid crystal panel having opposing upper and lower surfaces;
    a back light unit disposed under the lower surface of the liquid crystal panel and joined with the liquid crystal panel;
    a housing supporting the back light unit and having a wall adjacent to the back light unit, the housing having at least one projection formed at the wall; and
    a frame having a first portion covering at least one edge of the upper surface of the liquid crystal panel and a second portion coupled to the wall of the housing, wherein the second portion of the flame is pressed by the projection such that the first portion of the frame is concave toward the upper surface of the liquid crystal panel.

2. The liquid crystal display device as claimed in claim 1, wherein the wall of the housing has two longer portions and two shorter portions, and the projection is formed in the substantially central part of the longer portion.

3. The liquid crystal display device as claimed in claim 1, wherein one part of the first portion of the frame is curved and concave to touch the liquid crystal panel.

4. The liquid crystal display device as claimed in claim 1, wherein the projection is integrally formed with the housing.

5. The liquid crystal display device as claimed in claim 1, wherein the projection is chamfered.

6. The liquid crystal display device as claimed in claim 1, wherein the second portion of the frame is substantially perpendicular to the first portion.

7. The liquid crystal display device as claimed in claim 1, wherein the wall of the housing is substantially parallel to the second portion of the frame.

8. A liquid crystal display device comprising:
a liquid crystal panel having opposing upper and lower surfaces;
a back light unit disposed under the lower surface of the liquid crystal panel and joined with the liquid crystal panel;
a housing supporting the back light unit and having a wall adjacent to the back light unit; and
a frame having a first portion covering at least one edge of the upper surface of the liquid crystal panel and a second portion with at least one projection protruded in a direction toward the wall of the housing, wherein the projection is pressed by the wall of the housing such that the first portion of the frame is concave toward the liquid crystal panel.

9. The liquid crystal display device as claimed in claim 8, wherein the second portion of the frame has two longer sides and two shorter sides, and the projection is formed in the substantially central part of the longer side of the second portion.

10. The liquid crystal display device as claimed in claim 8, wherein one part of the first portion of the frame is curved and concave to touch the upper surface of the liquid crystal panel.

11. The liquid crystal display device as claimed in claim 8, wherein the projection is integrally formed with the frame.

12. The liquid crystal display device as claimed in claim 8, wherein the projection is formed by press operation applied to the second portion of the frame.

13. The liquid crystal display device as claimed in claim 8, wherein the second portion of the frame is substantially perpendicular to the first portion.

14. The liquid crystal display device as claimed in claim 8, wherein the wall of the housing is substantially parallel to the second portion of the frame.

15. The liquid crystal display device as claimed in claim 8, wherein the projection is chamfered.

* * * * *